Oct. 20, 1970

V. B. HOSTETLER ET AL 3,534,526

APPARATUS FOR FILLING CAPSULES

Filed Sept. 30, 1968

INVENTOR.
VAN B. HOSTETLER
THEODORE F. ARONSON
BY

ATTORNEY

INVENTOR.
VAN B. HOSTETLER
THEODORE F. ARONSON
BY

ATTORNEY

United States Patent Office 3,534,526
Patented Oct. 20, 1970

3,534,526
APPARATUS FOR FILLING CAPSULES
Van B. Hostetler, Indianapolis, Ind., and Theodore F. Aronson, Glen Cove, N.Y., assignors to Eli Lilly and Company, Indianapolis, Ind., a corporation of Indiana
Filed Sept. 30, 1968, Ser. No. 763,763
Int. Cl. B65b 1/00
U.S. Cl. 53—282                                   7 Claims

ABSTRACT OF THE DISCLOSURE

An apparatus for filling hard gelatin capsules having a cap section and a body section. A pair of endless and continuously moving conveyors are used to transport the cap and body sections through a filling station and a closing station whereby the empty cap is reassembled to the filled body.

BACKGROUND OF THE INVENTION

With the development of hard gelatin capsules comprising a cap section telescoped over a body section, numerous apparatus have been designed for automatically filling such capsules with pharmaceutical powders, granules and the like. In general, such apparatus requires a first station where the capsules are oriented with all of the body sections pointing in a single direction. With the capsules so oriented the cap sections are removed from the body sections which are then transported to a hopper containing the appropriate pharmaceutical powder. The powder is introduced into the body sections which are then subsequently conveyed along with their cap sections to a closing station which reassembles the capsule elements. In designing such apparatus a number of considerations must be taken into account including accuracy, speed, dependability, the amount of time needed to clean the apparatus for receiving a different type of pharmaceutical powder and the maintenance required to assure full use of the apparatus.

Although capsule filling apparatus of the prior art have been satisfactory in general with respect to accuracy and speed, such units have had disadvantages with respect to breakdowns and the longer than desired amount of time needed to clean them. The complexities of such apparatus make them particularly vulnerable to breakdowns. Apparatus of the prior art have relied primarily on a number of reciprocating motions, particularly in those phases where the cap sections and body sections are removed and subsequently rejoined. These reciprocating motions have caused the units to fail in view of the severe stress placed on certain components. Efforts to overcome these failures by strengthening the components have only resulted in larger types of equipment with an increased number of parts which in turn increase inertia problems as well as making it more difficult to quickly clean the equipment for use with another medicament.

SUMMARY OF THE INVENTION

My invention includes a system and a method for filling capsules whereby fewer moving parts are required and, in particular, reciprocal motion is greatly reduced. In general, capsule sections are transported on a pair of conveyors whereby the body sections are subjected to a conventional type powder-filling station. The filled body sections are then transported on a conveyor to a point beneath a second conveyor carrying the cap sections. The pair of conveyors with their now coaxially aligned cap and body sections are transmitted to a closing station whereby the cap sections are telescoped over the filled body sections. This novel apparatus utilizes continuous or endless conveyors which transport the capsule sections through a number of basic stations without requiring any intermittent motion. Thus, the conveyors are continuously moving, and reciprocal and intermittent motions are eliminated.

DESCRIPTION OF THE PREFERRED EMBODIMENT

Figure 1:
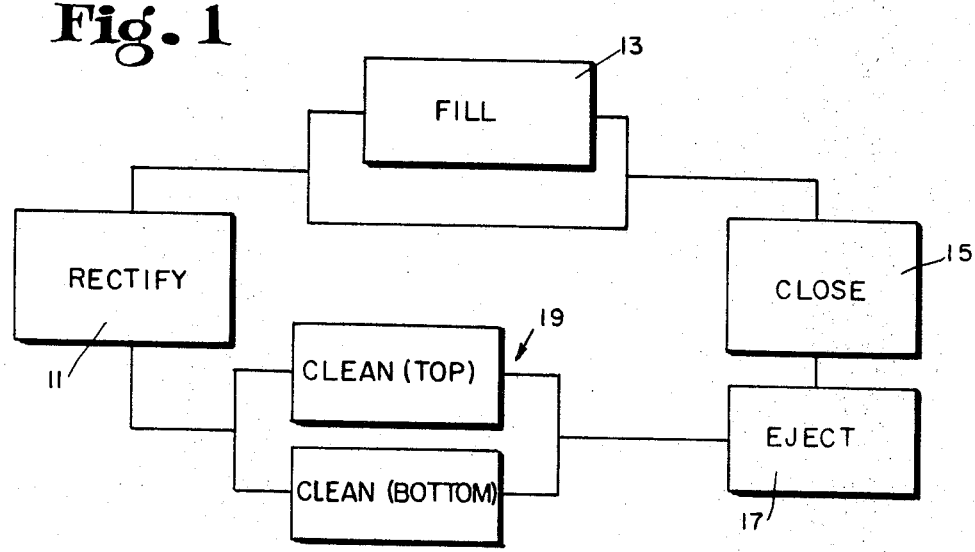
FIG. 1 is a block diagrammatic showing of the method performed by my apparatus setting forth the several stations through which the capsule sections pass.

Referring to FIG. 1, the apparatus and method of this invention comprise a number of stations beginning with an orientation or rectifying station 11, a filling station 13, a closing station 15, an ejection or discharge station 17 and a cleaning station 19.

Figure 2:
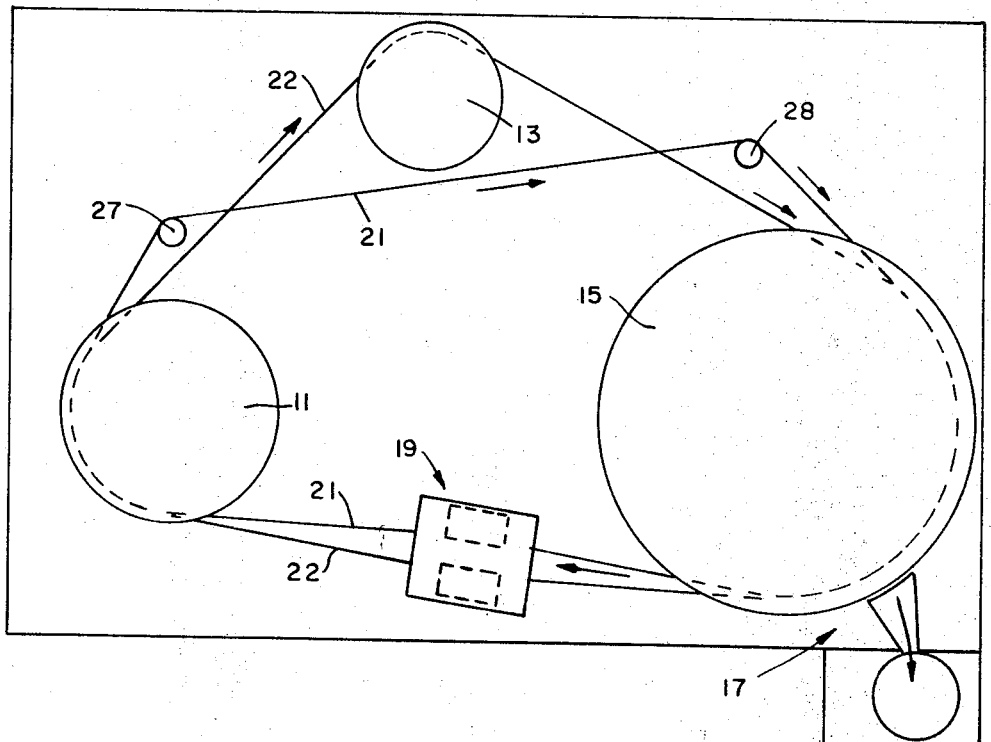
FIG. 2 is a schematic showing of a pair of endless conveyors cooperating with the several stations of the filling apparatus.

As shown in FIG. 2, a pair of endless conveyors 21 and 22 are provided for transporting a capsule cap section and body section 24 and 25 (FIG. 4), respectively. At the rectifying station the pair of conveyors are juxtaposed with the conveyor 21 carrying the cap section being on top. As the conveyors exit the rectifying station, conveyor 21 is guided by an idler 27 while conveyor 22 containing the capsule body section is directed toward filling station 23 in lateral displacement related to conveyor 21. Conveyor 21 passes by a second idler 28 and rejoins conveyor 22 in a juxtaposed relationship as the two conveyors enter the closing station 15. After the capsules have been filled and closed, they are ejected from their conveyors at discharge station 17. The two conveyors are then guided through diverging paths to a pair of cleaning stations 19 which remove any damaged capsules and excess powder from the conveyors prior to their receiving additional empty capsules from the rectifying station 11.

DRIVING MECHANISM

Figure 3:
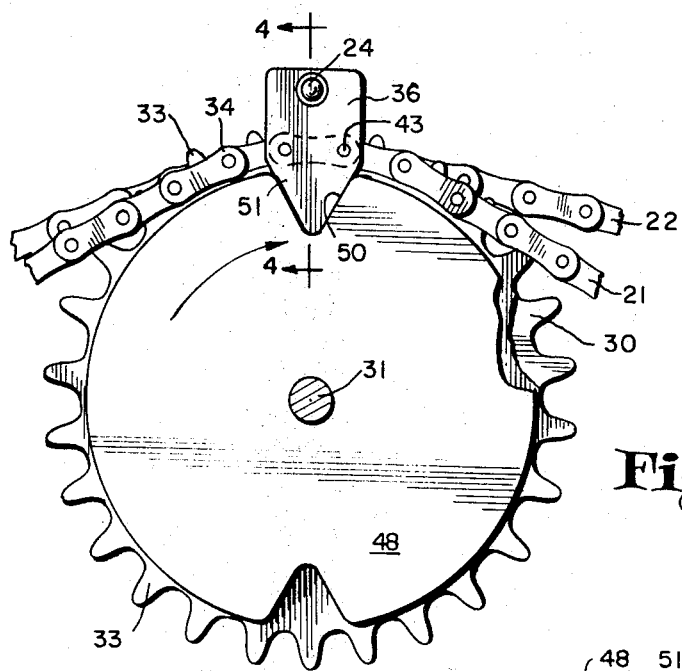
FIG. 3 is a top view of the pair of conveyors cooperating with a driving means.

The driving mechanism for the filling apparatus of my invention comprises a conventional motor of sufficient capacity to operate all of the stations of this apparatus as well as the pair of conveyors. As shown in FIG. 2, the rectifying, filling and closing stations comprise apparatus directly coupled to the conveyors. Thus, the power transmitted to the conveyors from the motor is used to drive the apparatus of these filling stations. In this manner synchronization of the stations with the capsules in the conveyors is obtained. One suitable means for transmitting the power of the motor to the station apparatus is by conveyors in the form of conventional link chains as shown in FIG. 3. Thus, a pair of sprockets 29 and 30 are mounted on a shaft 31 that is coupled to the motor which is unillustrated. As the sprockets are rotated in a clockwise fashion, their teeth 33 engage the individual links 34 of the pair of conveyors 21 and 22. Likewise, each of the stations of the apparatus utilizes a sprocket mechanism for receiving power from the chain conveyors. However, it is to be understood that other means such as cables or metal tapes may be adapted to take the place of the chains.

RECTIFYING STATION

The rectifying station 11 may comprise a conventional unit such as described in U.S. Pat. 1,545,777 issued to A. W. Kath et al. Another suitable form for rectifying the capsules whereby the body sections all point in one direction may be found in U.S. 3,242,638 issued to Harris. There are many other types of apparatus available for rectifying the capsules which will be readily compatible with the apparatus and method of this invention. Thus, as the capsules become oriented with their body sections pointing downwardly they will be inserted into capsule section holders 36 and 37 which are designed for receiving the cap section and body section, respectively.

Figure 4:
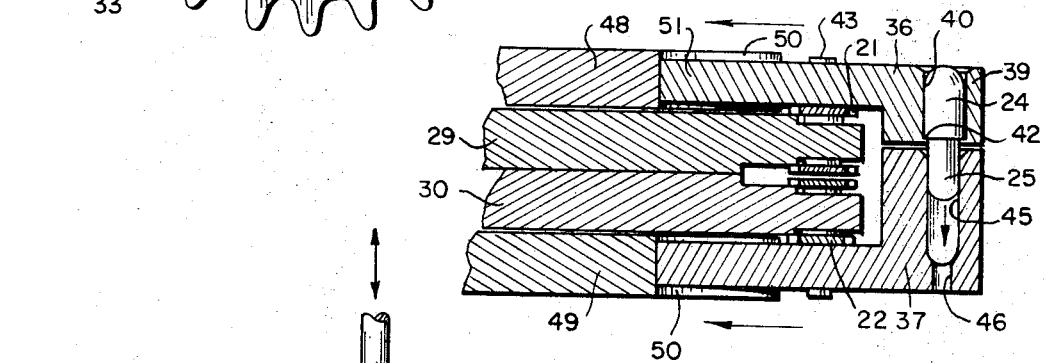
FIG. 4 is a view in cross section taken along line 4—4 of FIG. 3.

As shown in FIG. 4, the cap section holder 36 extends from conveyor 21 whereby its seat 39 is clear of the chain. Seat 39 has a bore 40 and an inwardly extending annular flange 42 which serves to retain the cap section. The upper portion of bore 40 may be chamfered to permit easy entry of the capsule sections. Cap section holder 36 may be removably coupled to chain 21 by means of a snap pin 43 that forms a portion of the chain linkage. In a similar fashion, body section holder 37 is removably mounted on conveyor chain 22. The body section holder has a bore 45 which terminates in a rounded portion conforming with the end of the capsule body section. A circular passageway 46 extends therefrom to the exterior.

After an assembled capsule is oriented in the capsule section holders, a vacuum is applied through passageway 46 and bore 45. Body section 25 is drawn downwardly and out of the interior of cap section 24 which is prevented from being drawn downwardly by flange 42.

Prior to the entry of the capsule sections into holders 36 and 37 it is essential that bores 40 and 45 are coaxially aligned. In FIGS. 3 and 4 a means for assuring such alignment is obtained through the use of a pair of alignment wheels 48 and 49 having one or more V-shaped cutouts 50 which are dimensioned to closely receive a pointed end 51 of body holder 37. Alignment wheels 48 and 49 are directly coupled to shaft 31 carrying sprocket 30. Inasmuch as capsule section holders 36 and 37 are removably mounted to the conveyor chains, it is apparent that the holders will have a small degree of play. However, as the pointed end 51 of each holder registers with an indexing means such as a cutout 50 on its respective alignment wheel, bores 40 and 45 become aligned and may receive a capsule.

FILLING STATION

A filling station of conventional design may also be used for filling the body sections as they are transported on conveyor chain 22. A variety of filling apparatus has been developed and includes means in the form of plungers or tampers as well as augers which carry a measured amount of pharmaceutical powder into the capsule body section. Another widely used means for filling capsules comprises dropping a quantity of pharmaceutical powder over the exposed opening of the body section and wiping it with a doctor blade. The widely used auger principle shown in U.S. 3,242,638, Harris, et al. is also suitable. In my preferred embodiment I have found that another suitable means is the use of a powder filling head similar in principle to that shown in U.S. 2,540,059 issued to Stirn. This type of filling head operates on a vacuum principle which assures a high degree of fill accuracy as well as maintaining a satisfactory speed without causing an undue loss of powder. Noting that the conveyor 22 is subjected to a continuous motion as it passes the filling station, it is apparent that a plurality of rotating filling nozzles 47 may be preferable. Synchronization is likewise important in that the filling nozzle 47 through which powder is introduced into a body section must be in precise alignment with the opening of the body section as the powder is ejected.

Thus, an alignment means similar to that shown in FIG. 3 is again employed. However, in this instance since only the body section conveyor chain 22 is guided through the filling station, there need be only one sprocket 30 and one alignment wheel 49. As end 51 of body section holder 37 engages a V-shaped cutout 50 the body section in the holder will become precisely oriented for coaxial alignment with a rotary traveling filling nozzle 43 in FIG. 5. At this moment of alignment the filling apparatus through a camming mechanism is actuated to release a measured amount of powder which may be compressed into a plug. The body section is now filled with powder and is conveyed by its conveyor chain to the closing station.

CLOSING AND EJECTING STATIONS

Figures 5, 6:
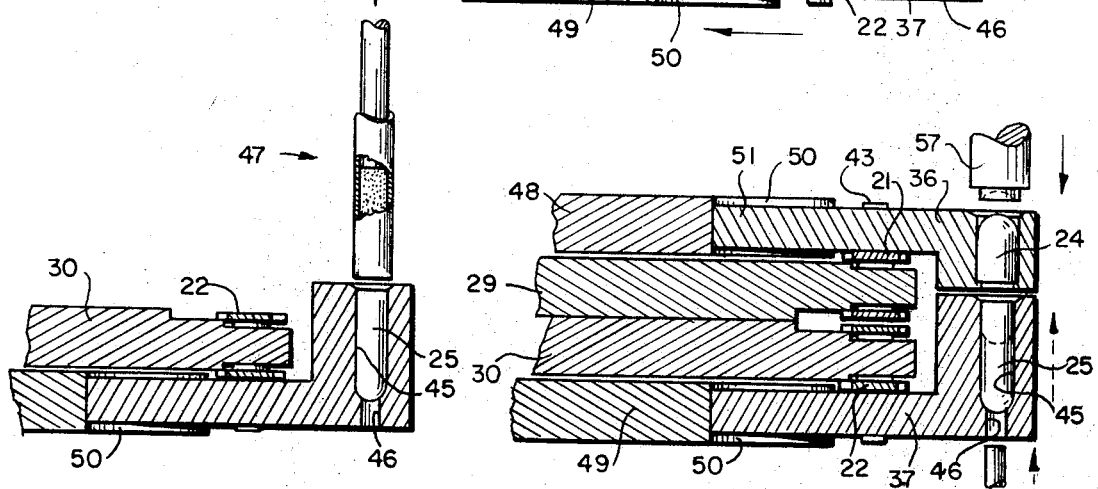
FIG. 5 is a view in cross section of the lower conveyor with a body section passing through a filling station.
FIG. 6 is a view in cross section similar to FIG. 4 but with the capsule sections passing through a closing station.

Upon reaching the closing station conveyor chains 21 and 22 with their respective holders assume a stacked position as shown in FIG. 6. The closing apparatus may be of conventional design utilizing the well-known concept of driving a pin 55 upwardly through passageway 46 and bore 45 for contact with the closed end of the capsule body section. The pin 55 continues its upward motion unit body section 25 is telescoped within cap section 24. The cap section is temporarily restrained in its holder by a stop element 57 which is momentarily positioned directly over the cap section bore 40. Pin 55 and stop element 57 may be mounted on a rotary wheel in order to accomodate the continuous motion of the conveyors. A camming mechanism will assure accurate alignment of the closing pin and stop element with the cap and body section holders inasmuch as the holders are once again registered with a pair of alignment wheels similar to the one shown in FIG. 3. The assembled and filled capsule, upon displacement of stop element 57, is ejected at the discharge station of the closing station by the upward motion of pin 55.

CLEANING STATION

As the pair of conveyor chains exit the closing and discharge stations they diverge into suitable cleaning stations which remove excess powder and clear bores 40 and 45 for receiving another empty capsule. These cleaning stations may comprise air jets which are cammed to actuate as the cap and body holders pass through them. Suitable means may be provided to capture the excess powder and avoid contaminating the surrounding components and atmosphere. With the holders now clean they continue their travel to the rectifying station where they once again become stacked and coaxially aligned for receiving another empty capsule.

The method of this invention and apparatus has been described with the use of a single pair of cap and body holders. However, it is to be understood that a plurality of such holders may be mounted at predetermined intervals on the pair of conveyors. Spacing of idlers 27 and 28 which guide the cap section conveyor chain is such that the length of this chain is identical to the body conveyor chain. In this manner the same cap section that has been removed from its body section at the rectifying station is rejoined to its body section at the closing station. Although there is a high degree of uniformity in capsules, it is desirable to assure that the body sections rejoin their identical cap sections and thereby avoid problems that might occur in the event that one or both of the sections has a minor but acceptable deformity. In some instances capsules become slghtly eccentric; and, therefore, if the same cap and body section do not rejoin each other there is a possibility that one or both sections will split when joined to different sections. Furthermore, proper matching of the sections will assure no misalignment of any printing on the sections since neither the cap section nor body section is likely to rotate in the filling apparatus of this invention.

It is to be noted that there is no intermittent action with respect to conveying the capsule sections through their stations. The use of the pair of conveyor chains provides a simple means for holding capsule holders which may be removed in the event a different sized capsule is to be used in the apparatus. The holders with their snap-in pins are simply removed and replaced with holders having bores of a different diameter. The other components of the apparatus will readily receive varying sizes of capsules with a minimum change of parts.

Although only one embodiment of this invention has been illustrated and described, it will be apparent to those with skill in the art that modifications can be made without departing from the spirit of this invention and the scope of the appended claims.

I claim:

1. Filling apparatus for introducing powder into capsules having a cap section and a body section comprising:
    a pair of separable, endless conveyors with a plurality of cap section holders on one of said conveyors and a plurality of body section holders on the other of said conveyors,
    a means for operating said conveyors;
    a capsule rectifying means in engagement with at least one of said conveyors,
    a capsule filling means in engagement with only said conveyor carrying said body section holders,
    a capsule closing means in engagement with at least one of said conveyors,
    said pair of conveyors at their point of engagement with said capsule rectifying means and said capsule closing means having their said respective cap and body section holders in coaxial alignment,
    said body section carrying conveyor being in lateral displacement relative to said cap section carrying conveyor at its point of engagement with said capsule filling means and having a body section holder with a capsule body section in powder-receiving alignment with said capsule filling means,
    and a pair of alignment wheels in coaxial alignment with said operating means and cooperating with respective registering means on said pair of conveyors causing said coaxial alignment of said cap and body section holders.

2. The filling apparatus defined in claim 1 in which said cap and body section holders are removably mounted on said conveyors.

3. The filling apparatus defined in claim 2 in which the coaxial alignment of said cap and body section holders places said cap section holder above said body section holder.

4. The filling apparatus defined in claim 3 in which a capsule ejecting means is closely associated with said capsule closing means.

5. The filling apparatus defined in claim 4 in which a cleaning station utilizing a jet stream of fluid is positioned for passage of said cap and body section holders upon ejection of a filled capsule.

6. The filling apparatus defined in claim 5 in which said pair of conveyors are of equal length to effect rejoining of a filled body section of the same body section from which it was separated.

7. The filling apparatus defined in claim 6 in which a third alignment wheel registers with an indexing means on said body section holder as it passes through said capsule filling means.

References Cited

UNITED STATES PATENTS 2,764,863   10/1956   Kath _____ 53—282

THERON E. CONDON, Primary Examiner

R. L. SPRUILL, Assistant Examiner

U.S. Cl. X.R.

53—381; 198—131